UNITED STATES PATENT OFFICE.

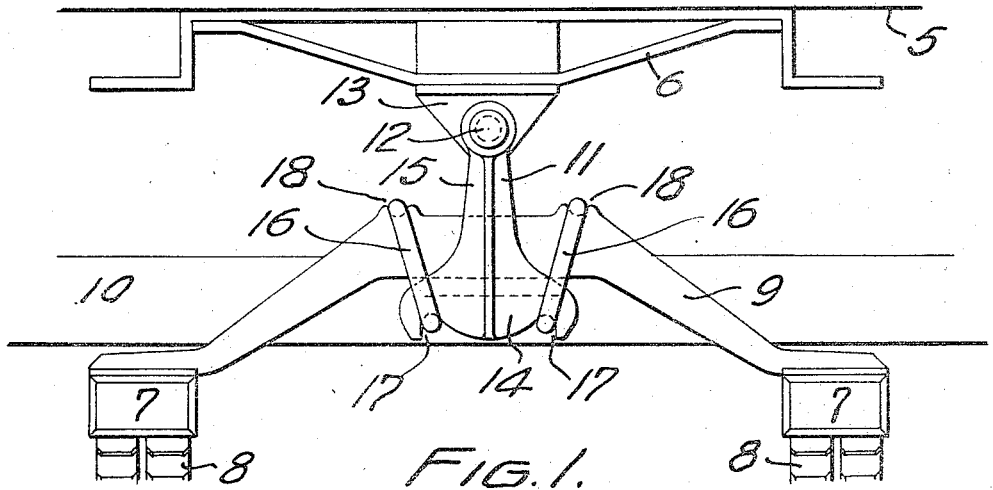
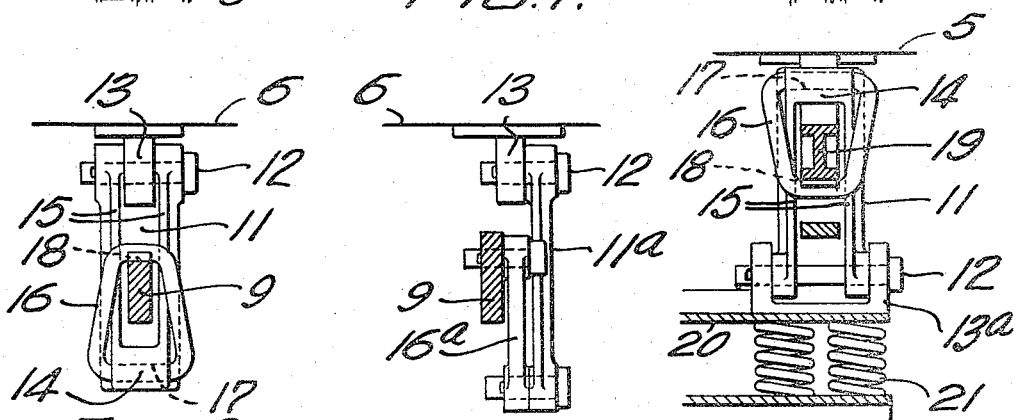
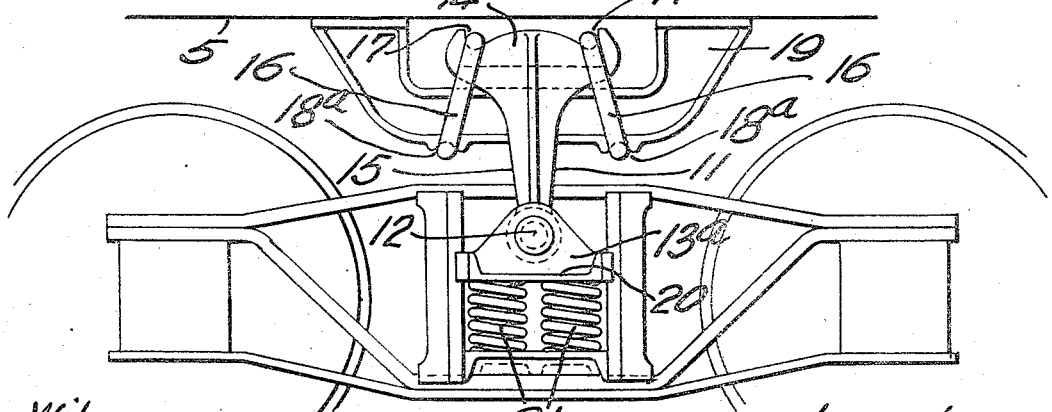

ALEXANDER STOIKOWITZ, OF MONTREAL, QUEBEC, CANADA, ASSIGNOR TO LINK SIDE-BEARING COMPANY, OF HAMMOND, INDIANA, A CORPORATION.

LINK-MOTION SIDE BEARING.

1,122,330.  Specification of Letters Patent.  Patented Dec. 29, 1914.

Application filed October 31, 1913. Serial No. 798,532.

*To all whom it may concern:*

Be it known that I, ALEXANDER STOIKOWITZ, a subject of the Emperor of Austria-Hungary, and resident of the city of Montreal, in the Province of Quebec and Dominion of Canada, have invented certain new and useful Improvements in Link-Motion Side Bearings, of which the following is a full, clear, and exact description.

This invention relates to improvements in side bearings for railway cars, and the object is to provide a means of attachment between car bodies and trucks which will act as a side bearing to prevent undue rocking of the body and at the same time hold the trucks to the cars in the event of collision, and thus prevent telescoping.

A further object is to provide a side bearing of the link type so designed that the truck will swivel within certain limits in a plane parallel with the floor.

A still further object is to provide means by which the weight of the car body may be carried at the sides of the truck in place of at the center, as is now the usual practice, thus reducing weight of truck and truck bolster and enabling a lighter truck to be used.

The device consists essentially of an oscillator or compression link attached at one end either to the car body or truck as desired, and connected at its opposite ends by tension links with the member to which it is not attached. These tension links are so proportioned and disposed that the truck may be swiveled under the car in a plane parallel with the floor.

In the drawings which illustrate the invention: Figure 1 is a side elevation of the device as applied to a truck of the six wheel passenger car type. Fig. 2 is a side elevation of the device as applied to a truck of the four wheel freight car type. Fig. 3 is an end elevation of the form shown in Fig. 1. Fig. 4 is an end elevation of the form shown in Fig. 2. Fig. 4ª is a view similar to Fig. 3, showing a slightly alternative form of link motion.

Referring more particularly to the drawings, 5 designates the lower edge of a body sill or the lower side of the floor, according to the structure of the car, and in Fig. 1, 6 designates a portion of the underframing of the car. In the same figure, 7 designates the truck bolsters resting on the elliptic springs 8 connected at adjacent ends by the arch bar 9. 10 designates the side frame of the truck. In this arrangement, the oscillator or compression link 11 is pivotally connected by the pin 12 to a suitable anchor plate 13 secured to the portion 6 of the car underframe. This oscillator is of U-shape, as clearly shown in Fig. 3, and is mounted on the pin 12 at the extremities of its arms, the central portion 14 passing under the arch bar, so that the side portions or arms 15 embrace the arch bar. Connection is established between the oscillator and the arch bar by means of tension links 16, which are of flattened ring form. These links engage in sockets 17 located equidistant from the vertical center of the oscillator at its looped end. The links 16 surround the arch bar, as clearly shown, and rest in sockets 18 formed on the upper edge thereof. The arch bar sockets 18 are formed farther apart than the oscillator sockets 17, so that the links diverge from one another at the ends nearest the pivotal point of the oscillator. This arrangement combined with certain approximate proportion of the parts is essential in order that the pivotal point may move in a horizontal plane within certain limits.

In the form shown in Figs. 2 and 4, a special hanger 19 is attached to the car body, and is provided with sockets 18ª on its lower edge corresponding with the sockets 18 in the upper edge of the arch bar. In a freight car truck, the load is carried on a swivel plank 20 resting at its ends on springs 21 in the truck side frames, and connected at its center with the car body by means of a king pin. In this invention, a socket member 13ª is attached to the end of the swivel plank and carries the oscillator 11, which is inverted as clearly seen and looped over the bracket 19, the links 16 resting in the oscillator sockets and in the sockets 18ª. In this way, the weight of the car is transmitted directly through the links and oscillator to the end of the swivel plank, so that there is no load applied at the center of the swivel plank.

In operation, this side bearing forms a positive connection between the truck and car body entirely independent of the king pin and of the chains used on passenger car trucks. The truck is in addition to being held to the body prevented from turning under the body beyond certain limits. In the form shown in Figs. 1 and 3, the device acts as a side bearing and as a connection between the car body and truck, but does not carry the load of the body, whereas in the form shown in Figs. 2 and 4, the device in addition to acting as a side bearing and connection between body and truck also carries the load of the body. The same effect may be produced in trucks of the passenger car type by connecting the device to the truck side frames, which is the load carrying member approximately corresponding to the swivel plank of the freight car truck. Should the car body rock, the movement is transmitted through the positive connection to the arch bar or to the swivel plank. Any side thrust of the car body as occurs in rounding a curve is transmitted through the oscillator, which is rigid in this direction, to the links which assume an inclined position relatively to the members supporting them, so that the side thrust is converted into an upward thrust and the stress on the king pin and wheel flanges removed. In rounding a curve, the truck also swivels, the oscillator assumes an inclined position, and one link assumes greater inclination than it normally has, while the other link assumes a lesser inclination, the resultant of the two link movements being a shifting of the pivotal center of the oscillator in a horizontal line and not in an arc. In this way, the truck swivels freely under the car, as there is no tendency to lift the same, which tendency would obviously resist the swiveling motion. In the event of collision or derailment of the cars, the side bearings from a positive connection between the trucks and car body, so that the cars are much more likely to remain upright and are absolutely prevented from telescoping, as the truck of one car will catch on the underframe of the next.

In the form shown in Fig. 4ª, the device is constructed without the use of the U-shaped oscillator and ring links, the oscillator being a straight piece on one side only of the bar and the links being similar straight members pinned at one end to the oscillator and at the other to the bar.

Having thus described my invention, what I claim is:—

1. A side bearing for cars, comprising the combination with two relatively movable car portions of an oscillator pivotally attached at one end to one of said car portions, and a pair of links connecting the opposite end of said oscillator with the other car portion.

2. In a side bearing, the combination with two relatively movable car portions, of a bar secured to one of said portions, a U-shaped oscillating member embracing said bar and pivotally connected to the other car portion, and links connecting the free end of said oscillator with the bar embraced by it.

3. In a side bearing, the combination with two relatively movable car portions, of a bar secured to one of said portions, a U-shaped oscillating member embracing said bar and pivotally connected to the other car portion, sockets formed on said bar, sockets formed on said oscillator, and links of substantially ring form resting in said oscillator and bar sockets and connecting the oscillator and bar.

4. In a side bearing, the combination with two relatively movable car portions, of a bar secured to one of said portions, a U-shaped oscillating member embracing said bar and pivotally connected to the other car portion, and links connecting said oscillator and bar diverging from their engagement with the oscillator to their engagement with the bar.

5. In a side bearing, the combination with two relatively movable car portions, of a bar secured to one of said portions, a U-shaped oscillating member embracing said bar and pivotally connected to the other car portion, and links connecting said oscillator with the bar arranged to allow the pivoted end of the oscillator limited movement in a straight line.

6. A link motion side bearing comprising the combination with two relatively movable car portions, of a bar attached to one of said car portions, a U-shaped oscillator embracing said bar and pivotally connected to the other car portion at the extremities of its arms, sockets formed in the loop of said oscillator equidistant from the axis thereof and on the side of the bar remote from the pivotal point of the oscillator, sockets formed on the bar on the side adjacent the oscillator pivotal point and at greater distance apart than the oscillator sockets, and links of ring form resting in the oscillator and bar sockets and connecting the oscillator and bar.

7. A side bearing for cars, comprising the combination with two relatively movable car portions, of an oscillator pivotally attached at one end to one of said car portions and projecting at the other end adjacent said other car portion, and links each pivotally connected at one end to the free end of said oscillator, said links diverging and being pivotally connected at their opposite ends to the other car portion.

8. A side bearing for cars comprising the combination with a car body and truck, of a plurality of links connecting the body and truck for limited movement in parallel planes.

9. A side bearing for cars comprising the combination with a car body and truck, of a link connection between the body and truck holding the truck inseparable from the car body.

10. A side bearing for cars comprising the combination with a car body and truck, of a link motion connecting the body and truck for limited movement in parallel planes.

11. A side bearing for cars comprising the combination with a car body and truck, of a link motion connecting the body and truck for limited movement in parallel planes and holding the truck inseparable from the body.

In witness whereof I have hereunto set my hand in the presence of two witnesses.

ALEXANDER STOIKOWITZ.

Witnesses:
S. R. W. ALLEN,
G. M. MORELAND.